United States Patent
Chen et al.

(10) Patent No.: US 11,851,597 B2
(45) Date of Patent: Dec. 26, 2023

(54) ETCHANT COMPOSITION, TACKIFIER, ALKALINE SOLUTION, METHOD OF REMOVING POLYIMIDE AND ETCHING PROCESS

(71) Applicant: eChem Solutions Corp., Taoyuan (TW)

(72) Inventors: Yu-Ning Chen, Taoyuan (TW); Ming-Che Chung, Taoyuan (TW)

(73) Assignee: eChem Solutions Corp., Taoyuan (TW)

( * ) Notice: Subject to any disclaimer, the term of this patent is extended or adjusted under 35 U.S.C. 154(b) by 0 days.

(21) Appl. No.: 17/241,086

(22) Filed: Apr. 27, 2021

(65) Prior Publication Data
US 2021/0371747 A1   Dec. 2, 2021

(30) Foreign Application Priority Data
May 29, 2020  (TW) ................... 109117963

(51) Int. Cl.
C09K 13/02 (2006.01)
C08J 7/12 (2006.01)

(52) U.S. Cl.
CPC ............. C09K 13/02 (2013.01); C08J 7/12 (2013.01)

(58) Field of Classification Search
None
See application file for complete search history.

(56) References Cited

U.S. PATENT DOCUMENTS

| | | | |
|---|---|---|---|
| 4,089,704 A | 5/1978 | Heiss, Jr. et al. | |
| 4,857,143 A | 8/1989 | Glenning et al. | |
| 5,929,134 A | 7/1999 | Lent et al. | |
| 6,635,585 B1 | 10/2003 | Khe et al. | |
| 2008/0121621 A1 | 5/2008 | Stockum et al. | |
| 2010/0068889 A1* | 3/2010 | Stockum | H01L 31/1804 438/745 |
| 2013/0065359 A1* | 3/2013 | Stockum | B82Y 10/00 438/99 |
| 2013/0168829 A1* | 7/2013 | Sasaki | C08K 5/42 257/618 |

FOREIGN PATENT DOCUMENTS

| | | |
|---|---|---|
| CN | 1177751 | 4/1998 |
| CN | 1349376 | 5/2002 |
| CN | 1545533 | 11/2004 |
| CN | 1603954 | 4/2005 |
| CN | 1761915 | 4/2006 |

(Continued)

OTHER PUBLICATIONS

"Office Action of China Counterpart Application", dated Jan. 30, 2022, p. 1-p. 12.

(Continued)

Primary Examiner — Allan W. Olsen
(74) Attorney, Agent, or Firm — JCIPRNET

(57) ABSTRACT

An etchant composition, a tackifier, an alkaline solution, a method of removing polyimide and an etching process are provided. The etchant composition includes a tackifier (A) and an alkaline solution (B). The tackifier (A) includes a resin containing a hydroxyl group (a), a surfactant (b) and a first solvent (c1). The alkaline solution (B) includes an alkaline compound (d) and a second solvent (c2).

14 Claims, 1 Drawing Sheet

(56) References Cited

FOREIGN PATENT DOCUMENTS

| | | |
|---|---|---|
| CN | 1925724 | 3/2007 |
| CN | 101528884 | 9/2009 |
| CN | 102893421 | 1/2013 |
| CN | 103992688 | 8/2014 |
| CN | 104576664 | 4/2015 |
| CN | 105307405 | 2/2016 |
| CN | 105733587 | 7/2016 |
| JP | H05283486 | 10/1993 |
| JP | 2012167144 | 9/2012 |
| TW | 200700340 | 1/2007 |
| TW | 200829667 | 7/2008 |
| TW | I503636 | 10/2015 |
| TW | I573247 | 3/2017 |
| TW | I599629 | 9/2017 |

OTHER PUBLICATIONS

Marco Villa et al., "Progress on large area GEMs", Nuclear Instruments and Methods in Physics Research A, Jul. 4, 2010, pp. 182-186.

Ga-Hong Wang, "Approach of a Reliable Solder Bump with RDL Structure for WLCSP Application study", Semiconductor Material and Process Equipment College of Engineering, Jun. 2006, pp. 1-58.

"Office Action of Taiwan Counterpart Application", dated Sep. 30, 2021, p. 1-p. 10.

"Office Action of Taiwan Related Application, Application No. 110145940", dated Dec. 22, 2022, p. 1-p. 6.

\* cited by examiner

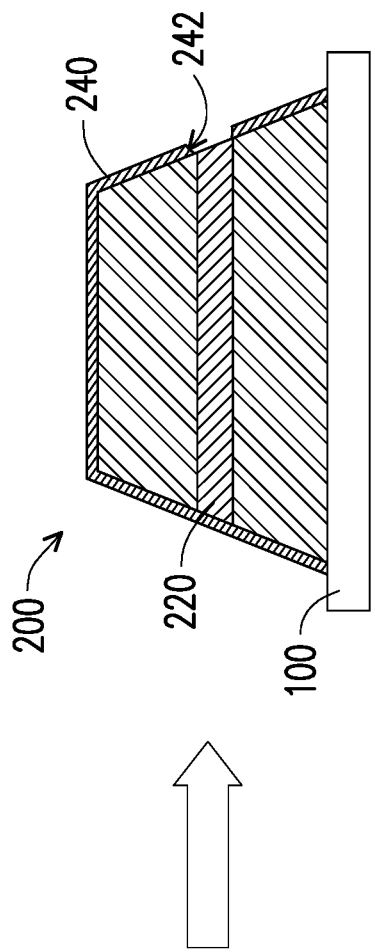
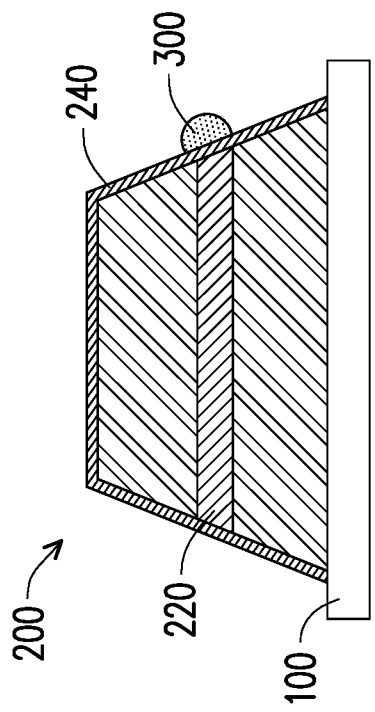

ETCHANT COMPOSITION, TACKIFIER, ALKALINE SOLUTION, METHOD OF REMOVING POLYIMIDE AND ETCHING PROCESS

CROSS-REFERENCE TO RELATED APPLICATION

This application claims the priority benefit of Taiwan application serial no. 109117963, filed on May 29, 2020. The entirety of the above-mentioned patent application is hereby incorporated by reference herein and made a part of this specification.

BACKGROUND OF THE INVENTION

1. Field of the Invention

The invention relates to an etchant composition, a tackifier and an alkaline solution, and more particularly relates to an etchant composition, a tackifier, an alkaline solution and a method of removing polyimide applicable to an etching process and the etching process.

2. Description of Related Art

Etching technologies are commonly applied to semiconductor-related industries and display equipment, and may be mainly classified into wet etching and dry etching. Generally, the wet etching is isotropic etching, and the dry etching is anisotropic etching. The isotropic etching requires a shorter process time than the anisotropic etching. However, the isotropic etching may cause an undercutting phenomenon between a patterned film layer and its adjacent film layer in a patterning process, and reliability of an electronic element and/or display quality of the display equipment are/is further influenced.

SUMMARY OF THE INVENTION

In view of this, the invention provides an etchant composition capable of forming good viscosity, peeling capability, corrosivity, residue performance and relieving an undercutting phenomenon, a tackifier and an alkaline solution applicable to the etchant composition, a method of removing polyimide and an etching process.

The etchant composition of the invention includes a tackifier (A) and an alkaline solution (B). The tackifier (A) includes a resin containing a hydroxyl group (a), a surfactant (b) and a first solvent (c1). The alkaline solution (B) includes an alkaline compound (d) and a second solvent (c2).

In an embodiment of the invention, a structure unit included in the resin containing a hydroxyl group (a) includes at least one of a phenolic resin containing a hydroxyl group and a polystyrene resin containing a hydroxyl group.

In an embodiment of the invention, the surfactant (b) includes at least one of a polyether surfactant containing an aryl group and a fluorine surfactant.

In an embodiment of the invention, based on a total usage amount of the tackifier (A) of 100 parts by weight, a usage amount of the resin containing a hydroxyl group (a) is in a range of 24 parts by weight to 52 parts by weight.

In an embodiment of the invention, the first solvent (c1) includes at least one selected from a group consisting of a lactam-based compound, a lactone-based compound and a phenyl alcohol-based compound.

In an embodiment of the invention, based on a total usage amount of the tackifier (A) of 100 parts by weight, a usage amount of the surfactant (b) is in a range of 1 part by weight to 60 parts by weight, and a usage amount of the first solvent (c1) is in a range of 16 parts by weight to 48 parts by weight.

In an embodiment of the invention, the alkaline compound (d) includes at least one selected from a group consisting of an alkali metal hydroxide, a carbonate compound and an amine-based hydroxide.

In an embodiment of the invention, the alkaline compound (d) includes at least one selected from a group consisting of potassium hydroxide, sodium hydroxide, sodium carbonate, potassium carbonate, calcium carbonate, sodium bicarbonate, tetramethylammonium hydroxide and monoethanolamine.

In an embodiment of the invention, the second solvent (c2) includes at least one of monohydric alcohol and polyhydric alcohol.

In an embodiment of the invention, the second solvent (c2) includes at least one selected from a group consisting of methanol, ethanol, isopropanol, ethylene glycol, pentanediol and glycerine.

In an embodiment of the invention, based on a total usage amount of the etchant composition of 100 parts by weight, a usage amount of the tackifier (A) is in a range of 30 parts by weight to 95 parts by weight, and a usage amount of the alkaline solution (B) is in a range of 5 parts by weight to 70 parts by weight.

In an embodiment of the invention, based on a total usage amount of the alkaline solution (B) of 100 parts by weight, a sum of a usage amount of the carbonate compound and a usage amount of the amine-based hydroxide in the alkaline compound (d) in the alkaline solution (B) is equal to or less than 4.29 parts by weight.

The tackifier of the invention is applicable to the etchant composition. The tackifier includes a resin containing a hydroxyl group (a), a surfactant (b) and a first solvent (c1).

The alkaline solution of the invention is applicable to the etchant composition. The alkaline solution includes an alkaline compound (d) and a second solvent (c2).

The method of removing polyimide of the invention includes applying the etchant composition to the polyimide on a predetermined position.

In an embodiment of the invention, the method of removing polyimide further includes: mixing the tackifier (A) and the alkaline solution (B).

The etching process of the invention includes using the method of removing polyimide.

In an embodiment of the invention, the etching process is used in a wire bonding process, and the etchant composition is applied to a predetermined position of a side surface of a polyimide layer so as to improve etching positioning accuracy.

Based on the above, the etchant composition of the invention uses the tackifier (A) including the resin containing a hydroxyl group (a), the surfactant (b) and the first solvent (c1), and the alkaline solution (B) including the alkaline compound (d) and the second solvent (c2). Therefore, the etchant composition may have good viscosity. When the etchant composition is used to remove an organic substance, the organic substance can be well removed without limiting an existence position of the organic substance (for example, a position on a surface parallel to a substrate, a position on a surface perpendicular to the substrate, a position on a surface forming an included angle of not being 0° or 90° with the substrate, etc.). Therefore, the undercutting phenomenon possibly occurring in an organic substance removing process can be avoided. Applicability to the method of removing polyimide and the etching process is realized.

To make the features and advantages of the invention clear and easy to understand, the following gives a detailed description of embodiments.

BRIEF DESCRIPTION OF THE DRAWINGS

FIG. 1 is a schematic diagram of part of a flow process of an etching process according to an embodiment of the invention.

DESCRIPTION OF THE EMBODIMENTS

<Etchant Composition>

The invention provides an etchant composition, including a tackifier (A) and an alkaline solution (B). Additionally, the etchant composition of the invention may further include an additive (E) according to requirements. The components described above will be illustrated in detail hereinafter.

<Tackifier (A)>

The tackifier (A) according to the present embodiment includes a resin containing a hydroxyl group (a), a surfactant (b) and a first solvent (c1). A preparation method of the tackifier (A) is not particularly limited. For example, the resin containing a hydroxyl group (a), the surfactant (b) and the first solvent (c1) are put into a stirrer to be stirred and uniformly mixed into a solution state. When necessary, an additive (E) may be further added. After uniform mixing, the liquid-state tackifier may be obtained. One kind of tackifier (A) may be singly used, and various kinds of tackifiers may also be combined for use.

When the etchant composition includes the tackifier (A) with specific composition, the etchant composition may have good viscosity. Additionally, the etchant composition and an organic substance in a predetermined position can be removed together by a solvent (such as water or an organic solvent).

Resin Containing a Hydroxyl Group (a)

A structure unit included in the resin containing a hydroxyl group (a) includes at least one of a phenolic resin containing a hydroxyl group and a polystyrene resin containing a hydroxyl group.

The phenolic resin containing a hydroxyl group is not particularly limited, and a proper phenolic resin containing a hydroxyl group may be selected according to requirements. For example, a structure unit included in the phenolic resin containing a hydroxyl group may include a structure unit shown as Formula (a-1), a structure unit shown as Formula (a-2), a structure unit shown as Formula (a-3) and a structure unit shown as Formula (a-4). In the present embodiment, a weight average molecular weight of the phenolic resin containing a hydroxyl group may be in a range of 1500 to 3000, but is not limited thereto.

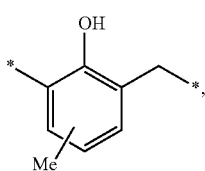

Formula (a-1)

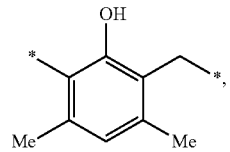

Formula (a-2)

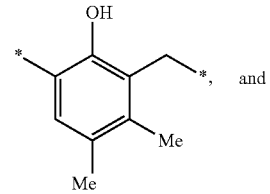

Formula (a-3)

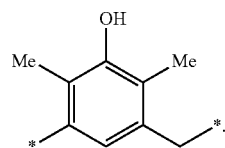

Formula (a-4)

In the structure units shown as Formula (a-1) to Formula (a-4), Me is a methyl group, and * represents a bonding position.

The polystyrene resin containing a hydroxyl group is not particularly limited, and a proper polystyrene resin containing a hydroxyl group may be selected according to requirements. For example, a structure unit included in the polystyrene resin containing a hydroxyl group may include a structure unit shown as Formula (a-5). In the present embodiment, a weight average molecular weight of the polystyrene resin containing a hydroxyl group may be in a range of 3500 to 6000, but is not limited thereto.

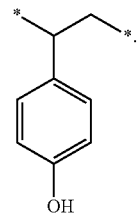

Formula (a-5)

In the structure unit shown as Formula (a-5), * represents a bonding position.

Based on a total usage amount of the tackifier (A) of 100 parts by weight, a usage amount of the resin containing a hydroxyl group (a) is in a range of 24 parts by weight to 52 parts by weight, and is preferably in a range of 31 parts by weight to 36 parts by weight.

When the tackifier (A) in the etchant composition includes the resin containing a hydroxyl group (a), the etchant composition and an organic substance in a predetermined position can be removed by a solvent (such as water or an organic solvent).

Additionally, when the tackifier (A) in the etchant composition includes the phenolic resin containing a hydroxyl group, a polyether surfactant containing an aryl group and a lactam-based compound, the etchant compositions with the phenolic resin containing a hydroxyl group in different usage amounts but all falling within the above preferable ranges may have good peeling capability, residue performance and/or corrosivity to the same degree. The peeling capability is a capability of peeling the etchant composition and the organic substance by water.

Surfactant (b)

The surfactant (b) includes at least one of a polyether-based surfactant containing an aryl group and a fluorine-based surfactant, and preferably includes a polyether-based surfactant containing an aryl group.

The polyether-based surfactant containing an aryl group is not particularly limited, and a proper polyether-based surfactant containing an aryl group may be selected according to requirements. For example, the polyether-based surfactant containing an aryl group may include polyoxyethylene styrenated aryl ether or other proper polyether-based surfactants containing an aryl group. One kind of polyether-based surfactant containing an aryl group may be singly used, and various kinds of polyether-based surfactants containing an aryl group may also be combined for use.

The fluorine-based surfactant is not particularly limited, and a proper fluorine-based surfactant may be selected according to requirements. For example, the fluorine-based surfactant may include a fluorine-containing polyether siloxane copolymer or other proper fluorine-based surfactants. One kind of fluorine-based surfactant may be singly used, and various kinds of fluorine-based surfactants may also be combined for use.

Based on the total usage amount of the tackifier (A) of 100 parts by weight, a usage amount of the surfactant (b) is in a range of 1 part by weight to 60 parts by weight, and is preferably in a range of 40 parts by weight to 60 parts by weight.

When the tackifier (A) in the etchant composition includes the surfactant (b), the etchant composition and the organic substance in the predetermined position can be removed by a solvent (such as water or an organic solvent). Additionally, if the tackifier (A) does not include the surfactant (b), the etchant composition including the tackifier (A) and the organic substance in the predetermined position can be removed by an organic solvent but cannot be removed by water.

First Solvent (c1)

The first solvent (c1) includes at least one selected from a group consisting of a lactam-based compound, a lactone-based compound and a phenyl alcohol-based compound, and preferably includes the lactam-based compound.

The lactam-based compound is not particularly limited, and a proper lactam-based compound may be selected according to requirements. For example, the lactam-based compound may include N-methyl-2-pyrrolidone, ε-caprolactam, N-methyl-ε-caprolactam, 2-pyrrolidone, 2-piperidone, N-methyl-2-piperidone, 2-quinolone, N-methyl-2-quinolone or other proper lactam-based compounds, and preferably includes N-methyl-2-pyrrolidone. One kind of lactam-based compound may be singly used, and various kinds of lactam-based compounds may also be combined for use.

The lactone-based compound is not particularly limited, and a proper lactone-based compound may be selected according to requirements. For example, the lactone-based compound may include γ-butyrolactone or other proper lactone-based compounds, and preferably includes γ-butyrolactone. One kind of lactone-based compound may be singly used, and various kinds of lactone-based compounds may also be combined for use.

The phenyl alcohol-based compound is not particularly limited, and a proper phenyl alcohol-based compound may be selected according to requirements. For example, the phenyl alcohol-based compound may include phenylcarbinol or other proper phenyl alcohol-based compounds, and preferably includes phenylcarbinol. One kind of phenyl alcohol-based compound may be singly used, and various kinds of phenyl alcohol-based compounds may also be combined for use.

Based on the total usage amount of the tackifier (A) of 100 parts by weight, a usage amount of the first solvent (c1) is in a range of 16 parts by weight to 48 parts by weight, and is preferably in a range of 24 parts by weight to 29 parts by weight.

When the tackifier (A) in the etchant composition includes the first solvent (c1), the etchant composition and the organic substance in the predetermined position can be removed by a solvent (such as water or an organic solvent). Additionally, when the first solvent (c1) in the tackifier (A) in the etchant composition includes the lactam-based compound, the etchant composition and the organic substance in the predetermined position can be removed by water.

<Alkaline Solution (B)>

The alkaline solution (B) according to the present embodiment includes an alkaline compound (d) and a second solvent (c2). A preparation method of the alkaline solution (B) is not particularly limited. For example, the alkaline compound (d) and the second solvent (c2) are put into a stirrer to be stirred and uniformly mixed into a solution state. When necessary, an additive (E) may be further added. After uniform mixing, the liquid-state alkaline solution may be obtained. One kind of alkaline solution (B) may be singly used, and various kinds of alkaline solutions (B) may also be combined for use.

When the etchant composition includes the alkaline solution (B) with specific composition, the etchant composition may have good etching capability. Additionally, the etchant composition and the organic substance in the predetermined position can be removed together by a solvent (such as water or an organic solvent).

Alkaline Compound (d)

The alkaline compound (d) includes at least one selected from a group consisting of an alkali metal hydroxide, a carbonate compound and an amine-based hydroxide, and preferably includes at least one of the alkali metal hydroxide or the alkali metal hydroxide and the carbonate compound, and the amine-based hydroxide. For example, the alkaline compound (d) preferably may be the alkali metal hydroxide, a combination of the alkali metal hydroxide and the carbonate compound or a combination of the alkali metal hydroxide and the amine-based hydroxide.

The alkali metal hydroxide is not particularly limited, and a proper alkali metal hydroxide may be selected according to requirements. For example, the alkali metal hydroxide may include potassium hydroxide, sodium hydroxide or other proper alkali metal hydroxides, and preferably includes potassium hydroxide. One kind of alkali metal hydroxide may be singly used, and various kinds of alkali metal hydroxides may also be combined for use.

The carbonate compound is not particularly limited, and a proper carbonate compound may be selected according to requirements. For example, the carbonate compound may include sodium carbonate, potassium carbonate, calcium carbonate, sodium bicarbonate or other proper carbonate compounds, and preferably includes sodium carbonate. One kind of carbonate compound may be singly used, and various kinds of carbonate compounds may also be combined for use.

The amine-based hydroxide is not particularly limited, and a proper amine-based hydroxide may be selected according to requirements. For example, the amine-based hydroxide may include tetramethylammonium hydroxide, monoethanolamine (MEA) or other proper amine-based hydroxides, and preferably includes monoethanolamine. One kind of amine-based hydroxide may be singly used, and various kinds of amine-based hydroxides may also be combined for use.

Based on a total usage amount of the alkaline solution (B) of 100 parts by weight, a usage amount of the alkaline compound (d) is more than 1.48 parts by weight, is preferably in a range of 1.5 parts by weight to 14 parts by weight, and is more preferably in a range of 4 parts by weight to 14 parts by weight.

Based on the total usage amount of the alkaline solution (B) of 100 parts by weight, a sum of a usage amount of the carbonate compound and a usage amount of the amine-based hydroxide in the alkaline compound (d) in the alkaline solution (B) is equal to or less than 4.29 parts by weight, and is preferably 0 part by weight or in a range of more than 2.25 parts by weight but less than 4.29 parts by weight.

When the alkaline solution (B) in the etchant composition includes the alkaline compound (d) with the usage amount falling within the above ranges, the etchant composition and the organic substance in the predetermined position can be removed by water. At the same time, when a usage amount of the alkaline compound (d) falls within the preferable ranges, the etchant composition may have good peeling capability and residue performance. The etchant composition and the organic substance in the predetermined position can be removed by water.

When the sum of the usage amount of the carbonate compound and the usage amount of the amine-based hydroxide in the alkaline compound (d) in the alkaline solution (B) in the etchant composition falls within the above ranges, the etchant composition and the organic substance in the predetermined position can be removed by a solvent (such as water or an organic solvent). At the same time, when the sum of the usage amount of the carbonate compound and the usage amount of the amine-based hydroxide in the alkaline compound (d) falls within the above preferable ranges, the etchant composition may have good peeling capability and residue performance. The etchant composition and the organic substance in the predetermined position can be removed by water.

Additionally, when the alkaline solution (B) in the etchant composition includes a combination of the alkali metal hydroxide and the carbonate compound and polyhydric alcohol, different etchant compositions including the alkali metal hydroxides with different usage amounts and the alkaline compounds (d) with the usage amounts all falling within the above preferable/more preferable ranges may have good peeling capability, residue performance and/or corrosivity to the same degree. The peeling capability is a capability of peeling the etchant composition and the organic substance by water.

Second Solvent (c2)

The second solvent (c2) includes at least one of monohydric alcohol and polyhydric alcohol.

The monohydric alcohol is not particularly limited, and proper monohydric alcohol may be selected according to requirements. For example, the monohydric alcohol may include methanol, ethanol, isopropanol or other proper monohydric alcohol, and preferably includes methanol. One kind of monohydric alcohol may be singly used, and various kinds of monohydric alcohol may also be combined for use.

The polyhydric alcohol is not particularly limited, and proper polyhydric alcohol may be selected according to requirements. For example, the polyhydric alcohol may include ethylene glycol (EG), pentanediol, glycerine or other proper polyhydric alcohol, and preferably includes ethylene glycol. One kind of polyhydric alcohol may be singly used, and various kinds of polyhydric alcohol may also be combined for use.

Based on the total usage amount of the alkaline solution (B) of 100 parts by weight, a usage amount of the second solvent (c2) is in a range of 86 parts by weight to 99 parts by weight, and is preferably in a range of 86 parts by weight to 96 parts by weight.

When the alkaline solution (B) in the etchant composition includes the second solvent (c2), the alkaline solution (B) and the tackifier (A) may be well mixed, so that the etchant composition is enabled to have good viscosity, and the etchant composition and the organic substance in the predetermined position can be removed together by a solvent (such as water or an organic solvent).

Based on a total usage amount of the etchant composition of 100 parts by weight, the usage amount of the tackifier (A) is in a range of 30 parts by weight to 95 parts by weight, and the usage amount of the alkaline solution (B) is in a range of 5 parts by weight to 70 parts by weight. Therefore, the etchant composition with good viscosity can be formed to remove an organic substance without located position limitation, and is thus applicable to a method of removing polyimide and an etching process.

Based on the total usage amount of the etchant composition of 100 parts by weight, the usage amount of the tackifier (A) is preferably in a range of 40 parts by weight to 80 parts by weight, and the usage amount of the alkaline solution (B) is in a range of 20 parts by weight to 60 parts by weight. When the usage amounts of the tackifier (A) and the alkaline solution (B) respectively fall within the above preferable ranges, the etchant composition with good viscosity may be formed to remove the organic substance without located position limitation, particularly with good peeling capability to well remove polyimide, and is thus applicable to the method of removing polyimide and the etching process.

Based on the total usage amount of the etchant composition of 100 parts by weight, the usage amount of the tackifier (A) is more preferably in a range of 55 parts by weight to 80 parts by weight, and the usage amount of the alkaline solution (B) is in a range of 20 parts by weight to 45 parts by weight. When the usage amounts of the tackifier (A) and the alkaline solution (B) respectively fall within the above more preferable ranges, the etchant composition with good viscosity may be formed to remove the organic substance without located position limitation, particularly well remove polyimide without residue on a substrate, and is thus applicable to the method of removing polyimide and the etching process.

Based on the total usage amount of the etchant composition of 100 parts by weight, the usage amount of the tackifier (A) is further more preferably in a range of 68 parts by weight to 80 parts by weight, and the usage amount of the alkaline solution (B) is in a range of 20 parts by weight to 32 parts by weight. When the usage amounts of the tackifier (A) and the alkaline solution (B) respectively fall within the above further more preferable ranges, the etchant composition with good viscosity may be formed to remove the organic substance without located position limitation, particularly well remove polyimide without residue on a substrate after the organic substance is removed and without corrosion on a metal thin sheet in a process of removing the organic substance, and is thus applicable to the method of removing polyimide and the etching process.

Additive (E)

The etchant composition may further include an additive (E). The additive (E) may also be added to the tackifier (A) or the alkaline solution (B) according to requirements. The additive (E) is not particularly limited, and a proper additive may be selected according to requirements. For example, the additive (E) may include a thicker, a levelling agent or other proper additives.

<Preparation Method of Etchant Composition>

The preparation method of the etchant composition is not particularly limited. For example, the tackifier (A) and the alkaline solution (B) are put into a stirrer to be stirred and uniformly mixed into a solution state. When necessary, the additive (E) may be further added. After uniform mixing, the liquid-state etchant composition may be obtained.

<Method of Removing Polyimide>

An exemplary embodiment of the invention provides a method of removing polyimide, including: the etchant composition is applied to the polyimide on a predetermined position.

The method of removing polyimide may include: the polyimide is coated onto a substrate/element to form a coating film, and the coating film is heated to be made into a polyimide film. Then, the etchant composition formed by mixing the tackifier (A) and the alkaline solution (B) is applied to the polyimide/polyimide film on the predetermined position. Then, the etchant composition and the polyimide/polyimide film in the predetermined position are removed together.

The substrate may be a glass substrate, a silicon wafer substrate or a plastic substrate material (such as a polyether sulfone (PES) plate or a polycarbonate (PC) plate), and types of the substrate are not particularly limited.

A coating method is not particularly limited, but may use a spray coating method, a rolling coating method, a spin coating method or similar methods. Generally, the spin coating method is widely used. Additionally, a coating film is formed. Then, under some conditions, residue solvents may be partially removed at reduced pressure.

A method of removing the etchant composition and the polyimide/polyimide film in the predetermined position is not particularly limited, but may use a peeling method known to those of ordinary skill in the art. In the present embodiment, the polyimide/polyimide film to which the etchant composition is applied may be immersed in a solvent (such as water or other proper solvents), then, the polyimide/polyimide film is rinsed by the solvent to remove the etchant composition and the polyimide/polyimide film in the predetermined position.

<Etching Process>

An exemplary embodiment of the invention provides an etching process including using the method of removing polyimide.

The etching process may include: an element (such as a photosensitive element) is formed on a substrate; a polyimide film is formed on the element; and the etchant composition and the polyimide film in the predetermined position are removed together by using the method of removing polyimide. The etching process may be used in a wire bonding process, and the etchant composition can be applied to the predetermined position on a side surface of a polyimide layer so as to improve the etching positioning accuracy.

FIG. 1 is a schematic diagram of part of a flow process of an etching process according to an embodiment of the invention. Referring to FIG. 1, a substrate 100 is provided. A photosensitive element 200 and a polyimide layer 240 covering the photosensitive element 200 are formed on the substrate 100. The photosensitive element 200 includes a conductive layer 220. Then, an etchant composition 300 is applied to the polyimide layer 240 on a predetermined position. The predetermined position refers to any position to be etched on the polyimide layer 240. For example, the predetermined position may be a position enabling the photosensitive element to be capable of performing a subsequent wire bonding process. In the present embodiment, the predetermined position is positioned at a side surface of the photosensitive element 200 (i.e., a surface forming an included angle of not being 0° or 90° with the substrate) and is positioned on an edge of the conductive layer 220. The conductive layer 220 may be a wiring layer to be subjected to the subsequent wire bonding process. That is, the etchant composition 300 is applied to the predetermined position of the side surface of the polyimide layer 240 (i.e., the position on the surface forming an included angle of not being 0° or 90° with the substrate). Therefore, the etching positioning accuracy can be improved.

Then, the etchant composition 300 and the polyimide layer in the predetermined position are removed together to form an opening 242. In the present embodiment, by removing the etchant composition 300 and the polyimide in the predetermined position, the formed opening 242 may have a vertical and sharp edge, so that an undercutting phenomenon often occurring in the etching process can be relieved, and the proceeding of the subsequent process and the efficiency improvement of electronic elements and devices are facilitated.

In the etching process, besides steps using the above method of removing polyimide and the above-mentioned steps, other steps and methods may use steps of the etching process known to those of ordinary skill in the art, and are not further described in detail herein.

Hereinafter, the invention will be described in detail with reference to examples. The following examples are provided to describe the invention, and the scope of the invention includes the scope described in the following claims and substituents and modifications thereof, and is not limited to the scope of the examples.

<Preparation of Tackifiers (A) and Alkaline Solutions (B)>

Tackifiers A1 to A13 and alkaline solutions B1 to B11 are described below.

Tackifier A1

33 parts by weight of phenolic resin containing a hydroxyl group (purchased from SUMITOMO Chemical Co., Ltd., including structure units of a structure unit shown as Formula (a-1), a structure unit shown as Formula (a-2), a structure unit shown as Formula (a-3) and a structure unit shown as Formula (a-4) and having a weight average molecular weight of about 2200) and 40 parts by weight of Sinopol 613 (being a trade name, and purchased from SINO-JAPAN CHEMICAL CO., LTD.) were added into 27 parts by weight of N-methyl-2-pyrrolidone, heated to 80° C. and uniformly stirred by a stirrer to then prepare the tackifier A1.

Tackifier A2 to Tackifier A13

The tackifiers A2 to A13 were prepared by the same steps as the tackifier A1. The differences were that types and usage amounts of components of the tackifiers (as shown in Table 2) were changed. Partial components/compounds in Table 2 are shown in Table 1.

TABLE 1

| Component/Compound | | Note |
|---|---|---|
| Resin containing a hydroxyl group (a) | Phenolic resin containing a hydroxyl group | Structure units included therein are a structure unit shown as Formula (a-1), a structure unit shown as Formula (a-2), a structure unit shown as Formula (a-3) and a structure unit shown as Formula (a-4), and a weight average molecular weight is about 2200 (manufactured by SUMITOMO Chemical Co., Ltd.) |
| | Polystyrene resin containing a hydroxyl group | A structure unit included therein is a structure unit shown as Formula (a-5), and a weight average molecular weight is about 5000 (manufactured by SUMITOMO Chemical Co., Ltd.) |
| Surfactant (b) | Sinopol 613 | Polyoxyethylene styrenated aryl ether (manufactured by SINO-JAPAN CHEMICAL CO., LTD.) |
| | Glide_410 | Fluorine-containing polyether siloxane copolymer (manufactured by Degussa Taiwan Ltd.) |

TABLE 2

| Components (Unit: part by weight) | | Tackifier | | | | | | |
|---|---|---|---|---|---|---|---|---|
| | | A1 | A2 | A3 | A4 | A5 | A6 | A7 |
| Resin containing a hydroxyl group (a) | Phenolic resin containing a hydroxyl group | 33 | 36 | 24 | 36 | 24 | 36 | 24 |
| | Polystyrene resin containing a hydroxyl group | — | — | — | — | — | — | — |
| Surfactant (b) | Sinopol 613 | 40 | 40 | 60 | 40 | 60 | 40 | 60 |
| | Glide_410 | — | — | — | — | — | — | — |
| First solvent (c1) | N-methyl-2-pyrrolidone | 27 | 24 | 16 | — | — | — | — |
| | γ-butyrolactone | — | — | — | 24 | 16 | — | — |
| | Phenylcarbinol | — | — | — | — | — | 24 | 16 |

| Components (Unit: part by weight) | | Tackifier | | | | | |
|---|---|---|---|---|---|---|---|
| | | A8 | A9 | A10 | A11 | A12 | A13 |
| Resin containing a hydroxyl group (a) | Phenolic resin containing a hydroxyl group | — | — | — | — | — | 60 |
| | Polystyrene resin containing a hydroxyl group | 31.2 | 51.48 | 50.44 | 49.4 | 30 | — |
| Surfactant (b) | Sinopol 613 | 40 | — | — | — | 40 | — |
| | Glide_410 | — | 1 | 3 | 5 | — | — |
| First solvent (c1) | N-methyl-2-pyrrolidone | 28.8 | 47.52 | 46.56 | 45.6 | — | 40 |
| | γ-butyrolactone | — | — | — | — | — | — |
| | Phenylcarbinol | — | — | — | — | 30 | — |

Alkaline Solution B1

9.14 parts by weight of potassium hydroxide (KOH) were added into 90.86 parts by weight of methanol, and were uniformly stirred by a stirrer at a room temperature to prepare the alkaline solution B 1.

Alkaline Solutions B2 to B11

The alkaline solutions B2 to B11 were prepared by the same steps as the alkaline solution B1. The differences were that types and usage amounts of components of the alkaline solutions (as shown in Table 3) were changed.

TABLE 3

| Components (Unit: part by weight) | | Alkaline solution | | | | | |
|---|---|---|---|---|---|---|---|
| | | B1 | B2 | B3 | B4 | B5 | B6 |
| Alkaline compound (d) | Potassium hydroxide (KOH) | 9.14 | 1.0 | 4.0 | 6.0 | 8.0 | 9.14 |
| | Sodium carbonate ($Na_2CO_3$) | — | 3.0 | 3.0 | 3.0 | 3.0 | — |
| | Monoethanolamine (MEA) | — | — | — | — | — | 4.29 |
| | Sodium bicarbonate ($NaHCO_3$) | — | — | — | — | — | — |
| Second solvent (c2) | Methanol | 90.86 | — | — | — | — | — |
| | Ethylene glycol (EG) | — | 96.0 | 93.0 | 91.0 | 89.0 | 86.57 |
| | Dimethyl sulfoxide | — | — | — | — | — | — |
| | N-methyl-2-pyrrolidone | — | — | — | — | — | — |

TABLE 3-continued

| Components | | Alkaline solution | | | | |
|---|---|---|---|---|---|---|
| (Unit: part by weight) | | B7 | B8 | B9 | B10 | B11 |
| Alkaline compound (d) | Potassium hydroxide (KOH) | 8.0 | 0.6 | 8.0 | 8.0 | 8.0 |
| | Sodium carbonate (Na$_2$CO$_3$) | — | — | 2.25 | 3.75 | 5.25 |
| | Monoethanolamine (MEA) | 2.76 | — | — | — | — |
| | Sodium bicarbonate (NaHCO$_3$) | — | 0.88 | — | — | — |
| Second solvent (c2) | Methanol | — | — | — | — | — |
| | Ethylene glycol (EG) | 26.77 | 69.8 | 62.83 | 44.125 | 26.03 |
| | Dimethyl sulfoxide | 62.47 | — | 26.92 | 44.125 | 60.72 |
| | N-methyl-2-pyrrolidone | — | 28.72 | — | — | — |

<Examples of Etchant Composition>

Example 1 to Example 16 and Comparative example 1 to Comparative example 12 of the etchant compositions are described below.

Example 1

80 parts by weight of the tackifier A1 and 20 parts by weight of the alkaline solution B1 were put into a stirrer, and were uniformly stirred by the stirrer at the room temperature to prepare an etchant composition of Example 1.

Example 6

55 parts by weight of the tackifier A1 and 45 parts by weight of the alkaline solution B2 were put into a stirrer, and were uniformly stirred by the stirrer at the room temperature to prepare an etchant composition of Example 6.

Examples 2 to 5, Examples 7 to 16 and Comparative Examples 1 to 12

Etchant compositions of Examples 2 to 5, Examples 7 to 16 and Comparative examples 1 to 12 were prepared by the same steps as Example 1. The differences were that types and usage amounts of components of the etchant compositions (as shown in Table 4) were changed. The prepared etchant compositions were evaluated in each evaluation mode below, and the results are shown in Table 5.

TABLE 4

| Components | | Examples | | | | | | | | | |
|---|---|---|---|---|---|---|---|---|---|---|---|
| (Unit: part by weight) | | 1 | 2 | 3 | 4 | 5 | 6 | 7 | 8 | 9 | 10 |
| Tackifier (A) | A1 | 80 | 75 | 70 | 65 | 60 | 55 | 50 | 40 | 72 | 68 |
| | A8 | — | — | — | — | — | — | — | — | — | — |
| | A13 | — | — | — | — | — | — | — | — | — | — |
| Alkaline solution (B) | B1 | 20 | 25 | 30 | 35 | 40 | — | — | — | — | — |
| | B2 | — | — | — | — | — | 45 | 50 | 60 | — | — |
| | B6 | — | — | — | — | — | — | — | — | 28 | 32 |
| | B7 | — | — | — | — | — | — | — | — | — | — |
| | B8 | — | — | — | — | — | — | — | — | — | — |
| | B9 | — | — | — | — | — | — | — | — | — | — |

| Components | | Examples | | | | | | Comparative examples | | | |
|---|---|---|---|---|---|---|---|---|---|---|---|
| (Unit: part by weight) | | 11 | 12 | 13 | 14 | 15 | 16 | 1 | 2 | 3 | 4 |
| Tackifier (A) | A1 | 65 | 50 | 70 | 60 | 50 | — | 95 | 90 | 80 | 78 |
| | A8 | — | — | — | — | — | 40 | — | — | — | — |
| | A13 | — | — | — | — | — | — | — | — | — | — |
| Alkaline solution (B) | B1 | — | — | — | — | — | — | 5 | 10 | — | — |
| | B2 | — | — | — | — | — | 60 | — | — | — | — |
| | B6 | 35 | 50 | — | — | — | — | — | — | 20 | 22 |
| | B7 | — | — | 30 | 40 | 50 | — | — | — | — | — |
| | B8 | — | — | — | — | — | — | — | — | — | — |
| | B9 | — | — | — | — | — | — | — | — | — | — |

| Components | | Comparative examples | | | | | | | |
|---|---|---|---|---|---|---|---|---|---|
| (Unit: part by weight) | | 5 | 6 | 7 | 8 | 9 | 10 | 11 | 12 |
| Tackifier (A) | A1 | 95 | 90 | 80 | 70 | 60 | 60 | — | — |
| | A8 | — | — | — | — | — | — | — | — |
| | A13 | — | — | — | — | — | — | 60 | 50 |
| Alkaline solution (B) | B1 | — | — | — | — | — | — | — | — |
| | B2 | — | — | — | — | — | — | 40 | 50 |
| | B6 | — | — | — | — | — | — | — | — |
| | B7 | — | — | — | — | — | — | — | — |
| | B8 | 5 | 10 | 20 | 30 | 40 | — | — | — |
| | B9 | — | — | — | — | — | 40 | — | — |

TABLE 5

| | | Examples | | | | | | | | | |
|---|---|---|---|---|---|---|---|---|---|---|---|
| | | 1 | 2 | 3 | 4 | 5 | 6 | 7 | 8 | 9 | 10 |
| Evaluation result | Peeling degree | ○ | ○ | ○ | ○ | ○ | ○ | ○ | ○ | ○ | ○ |
| | Corrosivity | ○ | ○ | ○ | Δ | X | Δ | X | X | ○ | ○ |
| | Residue degree | ○ | ○ | ○ | ○ | ○ | ○ | ○ | ○ | ○ | ○ |

| | | Examples | | | | | | Comparative examples | | |
|---|---|---|---|---|---|---|---|---|---|---|
| | | 11 | 12 | 13 | 14 | 15 | 16 | 7 | 8 | 9 |
| Evaluation result | Peeling degree | ○ | ○ | ○ | ○ | ○ | ○ | X | X | X |
| | Corrosivity | Δ | X | ○ | ○ | Δ | X | ○ | ○ | ○ |
| | Residue degree | ○ | Δ | ○ | ○ | ○ | ○ | ○ | ○ | ○ |

*The etchant compositions of Comparative examples 1 to 12 can etch the polyimide film, but the etchant composition and the polyimide film in the predetermined position needed to be peeled by a solvent except for water, so that only the evaluation results of Comparative examples 7 to 9 were listed in Table 5.

<Evaluation Mode> a. Peeling Degree

Polyimide was coated on a substrate (silicon wafer) by a spin coating method to form a coating film, and the coating film was heated by a nitrogen gas drying oven to prepare a polyimide film. Then, the prepared etchant composition was dripped on a predetermined position on the polyimide film. After still standing for a period of time, the silicon wafer including the polyimide film and the etchant composition was soaked in water, and then, the surface of the silicon wafer was cleanly flushed with water. By means of an optical microscope (manufactured by Olympus Co. Ltd.), whether the polyimide film in the predetermined position was peeled from the substrate or not was observed at a magnification of 500 times so as to evaluate the peeling degree.

An evaluation standard of the peeling degree is as follows:
o: completely peeled from the substrate;
Δ: partially peeled from the substrate; and
X: incapable of being peeled from the substrate.

b. Corrosivity

The prepared etchant composition was dripped onto a substrate with a material of aluminium. After still standing for a period of time, the substrate dripped with the etchant composition was soaked in water. Then, the surface of the substrate was cleanly flushed with water. By means of an optical microscope (manufactured by Olympus Co. Ltd.), whether a corrosion phenomenon existed on the surface of the original substrate dripped with the etchant composition or not was observed at a magnification of 500 times so as to evaluate the corrosivity.

An evaluation standard of the corrosivity is as follows:
o: no corrosion on the substrate;
Δ: slight corrosion on the substrate; and
X: corrosion on the substrate.

c. Residue Degree

The prepared etchant composition was dripped onto a substrate with a material of indium tin oxide (ITO) glass. After still standing for a period of time, the substrate dripped with the etchant composition was soaked in water. Then, the surface of the substrate was cleanly flushed with water. Whether the etchant composition was remained on the surface of the substrate or not was directly observed by naked eyes so as to evaluate the residue degree.

An evaluation standard of the residue degree is as follows:
o: no residue on the substrate;
Δ: a little residue on the substrate; and
X: obvious residue.

<Evaluation Results>

It can be known from the examples that the etchant compositions (Examples 1 to 16) including the tackifier (A) with a specific composition and the alkali solution (B) with a specific composition have good peeling capability by a solvent (such as water or an organic solvent).

It can be known from Table 5 that the etchant compositions (Examples 1 to 16) including the tackifier (A) with a specific composition and the alkali solution (B) with a specific composition and meeting a condition that a usage amount of the alkaline compound (d) of more than 1.48 parts by weight based on a total usage amount of the alkali solution (B) of 100 parts by weight have good peeling capability by water and residue performance. Compared to this, the etchant compositions (Comparative examples 11 and 12) including the tackifier (A) excluding a surfactant (b) may enable the etchant composition and the organic substance in the predetermined position to be removed by a solvent (such as an organic solvent) except for water. Additionally, the etchant compositions (Comparative examples 5 to 9) including an alkaline compound (d) at a usage amount of equal to or less than 1.48 parts by weight may enable the etchant composition and the organic substance in the predetermined position to be removed by a solvent (such as an organic solvent) except for water.

Additionally, the etchant compositions (Examples 1 to 16 and Comparative examples 3 to 4) including the tackifier (A) at a usage amount in a range of 40 parts by weight to 80 parts by weight and the alkaline solution (B) at a usage amount in a range of 20 parts by weight to 60 parts by weight based on a total usage amount of the etchant composition of 100 parts by weight have good peeling capability. The peeling capability is a capability of peeling the etchant composition and the organic substance by a solvent.

Additionally, the etchant compositions (Examples 1 to 11 and Examples 13 to 16) including the tackifier (A) at a usage amount in a range of 55 parts by weight to 80 parts by weight and the alkaline solution (B) at a usage amount in a range of 20 parts by weight to 45 parts by weight based on the total usage amount of the etchant composition of 100 parts by weight have good peeling capability and residue performance. The peeling capability is a capability of peeling the etchant composition and the organic substance by water. Compared to this, the residue performance of the etchant composition (Example 12) including the tackifier (A) and the alkaline solution (B) at usage amounts not in the above ranges is poor.

Additionally, the etchant compositions (Examples 1 to 3, Examples 9 to 10 and Example 13) including the tackifier (A) at a usage amount in a range of 68 parts by weight to 80 parts by weight and the alkaline solution (B) at a usage amount in a range of 20 parts by weight to 32 parts by weight based on a total usage amount of the etchant composition of 100 parts by weight have good peeling capability, residue performance and corrosivity. The peeling capability is a capability of peeling the etchant composition and the organic substance by water. Compared to this, the residue performance and/or the corrosivity of the etchant compositions (Examples 4 to 8, Examples 11 to 12, and Examples 15 to 16) including the tackifier (A) and the alkaline solution (B) at usage amounts not in the above ranges are/is poor.

Additionally, the etchant compositions (Examples 1 to 16) meeting a condition that a sum of a usage amount of a carbonate compound and a usage amount of an amine-based hydroxide in the alkaline compound (d) in the alkaline solution (B) is equal to or less than 4.29 parts by weight based on a total usage amount of the alkaline solution (B) of 100 parts by weight have good peeling capability. Additionally, the etchant compositions (Examples 1 to 5 and Examples 17 to 18) meeting a condition that the sum of the usage amount of the carbonate compound and the usage amount of the amine-based hydroxide in the alkaline solution (B) is 0 part by weight and the etchant compositions (Examples 6 to 8 and Examples 13 to 16) meeting a condition that the sum of the usage amount of the carbonate compound and the usage amount of the amine-based hydroxide in the alkaline compound (d) in the alkaline solution (B) is in a range of more than 2.25 parts by weight to less than 4.29 parts by weight based on a total usage amount of the alkaline solution (B) of 100 parts by weight have good peeling capability and residue performance. The peeling capability is a capability of peeling the etchant composition and the organic substance by water.

In other embodiments (not shown in Table 5), when the tackifier (A) in the etchant composition does not include a surfactant (b) (tackifier A13), the etchant composition and the organic substance in the predetermined position can be removed by an organic solvent (such as acetone), but cannot be removed by water. Additionally, when the surfactant (b) in the tackifier (A) in the etchant composition includes a fluorine-based surfactant (tackifiers A9 to A11), the etchant composition and the organic substance in the predetermined position can be removed by water.

In other embodiments, when a structure unit included in the resin containing a hydroxyl group (a) in the tackifier (A) in the etchant composition includes a phenolic resin containing a hydroxyl group, but the first solvent (c1) does not include a lactam-based compound (tackifier A4 and tackifier A6), the etchant composition and the organic substance in the predetermined position can be removed by an organic solvent (such as acetone). Additionally, if the usage amount of the surfactant (b) in the tackifier (A) in the etchant composition is increased (tackifier A5 and tackifier A7), the etchant composition and the organic substance in the predetermined position can be removed by water.

In other embodiments, when a structure unit included in the resin containing a hydroxyl group (a) in the tackifier (A) in the etchant composition includes a polystyrene resin containing a hydroxyl group, but the first solvent (c1) does not include a lactam-based compound (tackifier A12), the etchant composition and the organic substance in the predetermined position can be removed by water.

Based on the above, when the etchant composition of the invention includes the tackifier (A) with the specific composition and the alkali solution (B) with the specific composition, the etchant composition has good viscosity. When the etchant composition is used to remove the organic substance, the organic substance in the predetermined position may be well removed without limiting a to-be-removed position (i.e., the predetermined position, for example, a position on a surface parallel to a substrate, a position on a surface perpendicular to the substrate, a position on a surface forming an included angle of not being 0° or 90° with the substrate, etc.) of the organic substance. Therefore, an undercutting phenomenon possibly occurring in an organic substance removing process can be relieved. Applicability to the method of removing polyimide and the etching process is realized. The efficiency of electronic elements and devices using the method of removing polyimide and the etching process can be further improved.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. An etchant composition, comprising:
   a tackifier (A), comprising a resin containing a hydroxyl group (a), a surfactant (b) and a first solvent (c1), wherein the first solvent (c1) comprises at least one selected from a group consisting of a lactam-based compound, a lactone-based compound and a phenyl alcohol-based compound;
      wherein based on a total usage amount of the tackifier (A) of 100 parts by weight, a usage amount of the resin containing a hydroxyl group (a) is in a range of 24 parts by weight to 52 parts by weight, and a usage amount of the surfactant (b) is in a range of 40 parts by weight to 60 parts by weight; and
   an alkaline solution (B), comprising an alkaline compound (d) and a second solvent (c2), wherein the second solvent (c2) comprises at least one of monohydric alcohol and polyhydric alcohol.

2. The etchant composition according to claim 1, wherein a structure unit comprised in the resin containing a hydroxyl group (a) comprises at least one of a phenolic resin containing a hydroxyl group and a polystyrene resin containing a hydroxyl group.

3. The etchant composition according to claim 1, wherein the surfactant (b) comprises at least one of a polyether-based surfactant containing an aryl group and a fluorine-based surfactant.

4. The etchant composition according to claim 1, wherein based on a total usage amount of the tackifier (A) of 100 parts by weight, a usage amount of the first solvent (c1) is in a range of 16 parts by weight to 48 parts by weight.

5. The etchant composition according to claim 1, wherein the alkaline compound (d) comprises at least one selected from a group consisting of an alkali metal hydroxide, a carbonate compound and an amine-based hydroxide.

6. The etchant composition according to claim 1, wherein the alkaline compound (d) comprises at least one selected from a group consisting of potassium hydroxide, sodium hydroxide, sodium carbonate, potassium carbonate, calcium carbonate, sodium bicarbonate, tetramethylammonium hydroxide and monoethanolamine.

7. The etchant composition according to claim 1, wherein the second solvent (c2) comprises at least one selected from a group consisting of methanol, ethanol, isopropanol, ethylene glycol, pentanediol and glycerine.

8. The etchant composition according to claim 1, wherein based on a total usage amount of the etchant composition of 100 parts by weight, a usage amount of the tackifier (A) is in a range of 30 parts by weight to 95 parts by weight, and a usage amount of the alkaline solution (B) is in a range of 5 parts by weight to 70 parts by weight.

9. The etchant composition according to claim 1, wherein based on a total usage amount of the alkaline solution (B) of 100 parts by weight, a sum of a usage amount of a carbonate compound and a usage amount of an amine-based hydroxide in the alkaline compound (d) in the alkaline solution (B) is equal to or less than 4.29 parts by weight.

10. A tackifier, applicable to an etchant composition according to claim 1 and comprising:
    a resin containing a hydroxyl group (a);
    a surfactant (b); and
    a first solvent (c1), wherein based on a total usage amount of the tackifier of 100 parts by weight, a usage amount of the resin containing a hydroxyl group (a) is in a range of 24 parts by weight to 52 parts by weight, and a usage amount of the surfactant (b) is in a range of 40 parts by weight to 60 parts by weight.

11. The tackifier according to claim 10, wherein a structure unit comprised in the resin containing a hydroxyl group (a) comprises at least one of a phenolic resin containing a hydroxyl group or a polystyrene resin containing a hydroxyl group.

12. The tackifier according to claim 10, wherein the surfactant (b) comprises at least one of a polyether-based surfactant containing an aryl group and a fluorine-based surfactant.

13. The tackifier according to claim 10, wherein the first solvent (c1) comprises at least one selected from a group consisting of a lactam-based compound, a lactone-based compound and a phenyl alcohol-based compound.

14. The tackifier according to claim 10, wherein based on a total usage amount of the tackifier (A) of 100 parts by weight, a usage amount of the first solvent (c1) is in a range of 16 parts by weight to 48 parts by weight.

* * * * *